United States Patent [19]
McCarville et al.

[11] Patent Number: 4,913,910
[45] Date of Patent: Apr. 3, 1990

[54] APPARATUS FOR FORMING LAMINATE INTO A PREDETERMINED CONFIGURATION

[75] Inventors: Douglas A. McCarville, Wichita, Kans.; Dennis C. Rocheleau, Euless, Tex.

[73] Assignee: The Boeing Company, Seattle, Wash.

[21] Appl. No.: 209,986

[22] Filed: Jun. 22, 1988

[51] Int. Cl.⁴ .............................................. B29C 53/28
[52] U.S. Cl. ........................................ 425/336; 72/184; 72/197; 264/286; 425/369; 425/394; 425/396; 425/411
[58] Field of Search ............... 425/369, 396, 394, 367, 425/383, 336, 363, 403; 264/286, 339; 72/184, 197

[56] References Cited

U.S. PATENT DOCUMENTS

| | | | |
|---|---|---|---|
| 16,215 | 12/1856 | Reynolds | 264/280 |
| 362,698 | 5/1887 | Appert | 65/255 |
| 1,138,747 | 5/1915 | Graves | 425/367 |
| 1,523,658 | 1/1925 | Matthias | 264/285 |
| 2,276,083 | 3/1942 | Moeller | 156/222 |
| 2,620,513 | 12/1952 | Cryor et al. | 72/181 |
| 2,674,764 | 4/1954 | Eaby et al. | 264/160 |
| 2,734,245 | 2/1956 | Chamberlain | 264/151 |
| 3,060,503 | 10/1962 | Eckert | 264/285 |
| 3,869,269 | 3/1975 | Knapp | 65/106 |
| 3,888,618 | 6/1975 | Jones | 425/336 |
| 4,108,938 | 8/1978 | Rosenblatt | 264/127 |
| 4,116,603 | 9/1978 | Lindgren et al. | 425/370 |
| 4,257,251 | 3/1981 | Jury | 72/184 |
| 4,514,998 | 5/1985 | Jury | 72/184 |
| 4,610,837 | 9/1986 | Frey | 264/339 |
| 4,732,638 | 3/1988 | Baker et al. | 425/367 |

FOREIGN PATENT DOCUMENTS

| | | | |
|---|---|---|---|
| 2800679 | 7/1979 | Fed. Rep. of Germany | 426/390 |
| 727152 | 3/1955 | United Kingdom | 425/396 |

*Primary Examiner*—Jay H. Woo
*Assistant Examiner*—K. P. Nguyen
*Attorney, Agent, or Firm*—Finnegan, Henderson, Farabow, Garrett & Dunner

[57] ABSTRACT

Apparatus for forming elongate laminate into a predetermined configuration having a substantially uniform cross-sectional shape in the axial direction, including a plurality of roller pairs having complementary transverse peripheral profiles, plate members disposed between the roller pairs and the laminate and having a transverse configuration corresponding to the peripheral profiles of the rollers.

23 Claims, 3 Drawing Sheets

APPARATUS FOR FORMING LAMINATE INTO A PREDETERMINED CONFIGURATION

BACKGROUND OF THE INVENTION

1. Field of the Invention

The invention relates to an apparatus for forming thermoplastic laminate into a predetermined configuration.

2. Description of the Related Art

Known devices for forming thermoplastic composite parts include devices using matched mold tools for surrounding the laminate which are placed under pressure, or heat and pressure, by presses or autoclaves.

One of the problems with this type of forming device is that autoclave operation is slow and costly. Another problem is that the tooling of the matched molds is costly. Still another problem with these devices is that the size of the mold tools, and therefore of the part being formed, is restricted by the size of the press or autoclave that is used to operate the matched mold tools.

Another known type of forming device is one in which heated thermoplastic laminate is passed through a series of pressure rollers which shape the bare laminate. Although roller-type devices have historically been used to form sheet metal parts, they have only recently been used to form thermoplastic laminate parts.

One of the problems with the known roller-type forming devices is that gaps are created between the rollers along the roller series where pressure is not maintained on the laminate. The lack of a continuous forming pressure exerted on the laminate as it moves through the rollers negatively affects the integrity of the formed part.

Additionally, since the laminate is exposed to the atmosphere between rollers, it cools unevenly. That is, the convective cooling that takes place between the laminate and the atmosphere is slow compared to the rapid conductive cooling that occurs between the laminate and the rollers, which are generally made of steel or aluminum. Thus, the lack of a continuous forming pressure and the relatively uneven cooling of the laminate tends to cause the laminate to be formed in a semi-compacted state that does not represent the desired shape of the part.

Another problem with this known roller-type forming device is that introducing the bare laminate to the rollers causes the individual plies of laminate to drape around the rollers, causing a bunching together of the laminate and resulting in an unevenly formed part.

Another known roller-type forming device includes a series of pairs of transitional rollers which progressively shape the laminate to the desired shape. Plates made of aluminum or steel that are used with the transitional rollers start out as generally flat plates and are progressively deformed by the transitional rollers. The profiles of the roller pairs change slightly along the series, becoming closer and closer to the ultimate shape, for progressively shaping the plates and the laminate. One problem with this method for forming a shaped part is that the transitional rollers must be individually designed and tooled since each set of rollers has a slightly different profile. Another problem is that the plates used with the transitional rollers must be replaced after each part is made due to the deformation to the plates caused by the transitional rollers.

SUMMARY OF THE INVENTION

Accordingly, it is an object of this invention to provide an improved apparatus for forming thermoplastic laminate into a predetermined configuration that overcomes the problems and disadvantages of the prior art.

It is another object of the invention to provide an apparatus for forming thermoplastic laminate into a predetermined configuration that does not require each roller to be specially designed.

It is a further object of the invention to provide an apparatus for forming thermoplastic laminate into a predetermined configuration that maintains a relatively constant pressure on the laminate as it is being formed.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the claims.

To achieve the objects and in accordance with the purposes of the invention, as embodied and broadly described herein, the apparatus of the invention relates to a device and related method for forming elongate laminate into a predetermined configuration having a substantially uniform cross-sectional shape in the axial direction, the device comprising first and second roller means rotatably mounted in peripheral tangential relation for defining a forming path therebetween, each said roller means having a transverse peripheral profile corresponding to the predetermined configuration of the formed laminate and being complementary to the other said roller means, a pair of elongated plate means each having a transverse configuration corresponding to the transverse peripheral profile of a respective one of the first and second roller means for engaging opposite surfaces of the elongate laminate and engaging the periphery of the respective first and second roller means to maintain a predetermined pressure on the laminate along the forming path.

The accompanying drawings, which are incorporated in and constitute a part of this specification, illustrate one embodiment of the invention and together with the description serve to explain the principles of the invention.

DESCRIPTION OF THE PREFERRED EMBODIMENT

Figure 1:
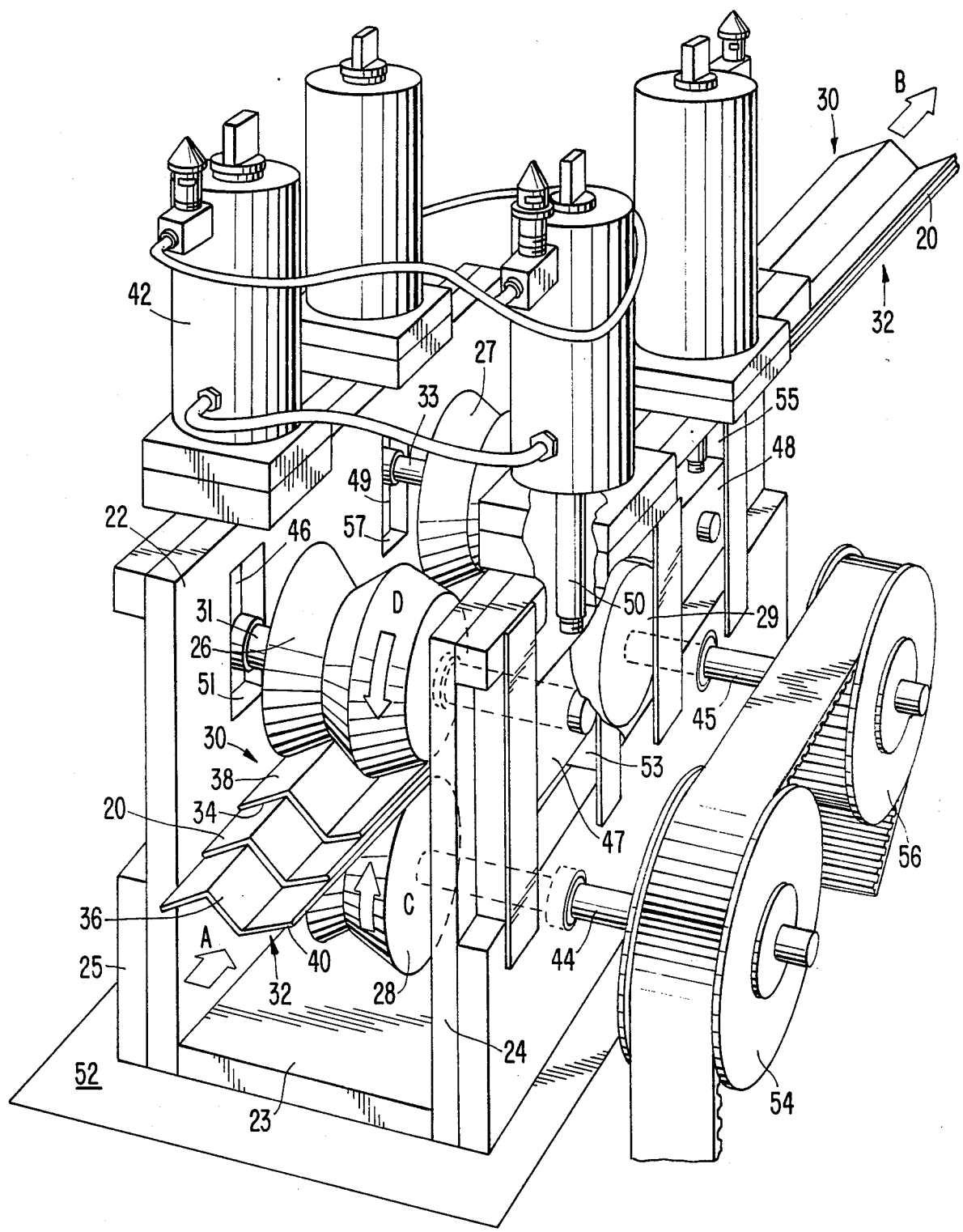
FIG. 1 is a perspective view of an apparatus for forming a thermoplastic laminate into a predetermined configuration and incorporating a roller and plate assembly of a first embodiment of the present invention for forming the thermoplastic laminate into a Z-shaped configuration.

Reference will now be made in detail to the present preferred embodiment of the invention, an example of which is illustrated in the accompanying drawings.

The invention relates to a device and method for forming thermoplastic laminate 20 into a predetermined configuration having a substantially uniform cross-sectional shape in the axial direction.

In accordance with the invention, the device includes first roller means for defining a transverse peripheral profile corresponding to the predetermined configuration of the formed laminate and second roller means for defining a transverse peripheral profile complementary to the peripheral profile of the first roller means. As embodied herein, the first roller means includes a plurality of upper rollers 26, 27 and the second roller means includes a plurality of lower rollers 28 and 29.

Preferably, each of the upper and lower rollers 26, 27 and 28, 29 are rotatably mounted on the supporting means. As embodied herein, the supporting means is a support frame 22 including a base 23 and sides 24 and 25.

In accordance with the invention, the first and second roller means are rotatably mounted adjacent one another on spaced parallel axes for defining a forming path therebetween. As embodied herein, upper roller 26 is positioned on shaft 31 adjacent lower roller 28 on shaft 44. Upper roller 27 is positioned on shaft 47 adjacent lower roller 29 on shaft 45. A forming path, the location and direction of which are indicated by arrows A and B, is defined between upper rollers 26, 27 and lower rollers 28, 29.

Preferably, at least one of the first and second roller means are movably mounted to move toward and away from the axis of the other of the first and second roller means. As embodied herein, upper rollers 26, 27 are mounted on sides 24, 25 of support frame 22 by movable mounting means. The movable mounting means includes upper shafts 31, 33 having corresponding upper rollers 26, 27 rotatably fixed thereon, support blocks 46, 47 and 48, 49 positioned on opposing ends of corresponding shafts 31, 33, and being slidably disposed in slots 51, 53 and 55, 57 arranged in opposing sides 24, 25 of the support frame 22. Support blocks 46, 47, 48, 49 are slidable within corresponding slots 51, 53, 55, 57 for moving upper rollers 26, 27 toward and away from lower rollers 28, 29.

In accordance with the invention, the device includes a pair of elongated plate means for engaging opposite surfaces of the elongate laminate and the periphery of the first and second roller means, each plate means having a transverse configuration corresponding to the peripheral profiles of the first and second roller means.

As embodied herein, the plate means includes upper plate 30 and lower plate 32. Each upper and lower plate 30 and 32 includes a respective forming surface 34 and 36 for engaging laminate 20 and forming laminate 20 to a shape corresponding to the shape of the forming surfaces 34 and 36. Each plate 30 and 32 also includes a respective contact surface 38 and 40 for engagingly receiving upper and lower rollers 26, 27 and 28, 29, respectively.

Plates 30, 32 are sufficiently rigid to prevent deformation at high temperatures. Preferably, plates 30, 32 are 0.03 to 0.09 inch thick steel plates. Aluminum plates may also be used.

Referring to FIG. 1, upper plate 30 has a forming surface 34 and a contact surface 38 with shapes corresponding to the periphery of upper roller 26. Similarly, lower plate 32 has a forming surface 36 and a contact surface 40 with shapes that correspond to the periphery of lower roller 28.

Preferably, means for selectively biasing said first and second roller means together are provided for biasing one of the first and second roller means toward the other of the first and second roller means to engage the pair of plate means for maintaining a predetermined pressure on the laminate along the forming path. As embodied herein, the biasing means includes air cylinders 42 which are operable to bias upper rollers 26, 27 toward lower rollers 28, 29. Each air cylinder 42 has a piston 50 for engaging support blocks 46, 47, 48, 49 and moving the support blocks within corresponding slots 51, 53, 55, 57, positioned perpendicular to forming path A-B.

Preferably, the device includes means for rotating at least one of the first and second roller means to convey the first and second plate means along the forming path at a predetermined rate.

As embodied herein, and referring to FIG. 1, the rotating means includes a toothed driving belt 52 which drives rollers 54 and 56. Driving roller 54 is fixed to shaft 44 which fixedly carries lower roller 28. Roller 56 is fixed to shaft 45 which fixedly carries lower roller 29. Accordingly, toothed driving belt 52 drives lower rollers 28, 29 in a direction shown by arrow C on roller 28 for conveying laminate 20 and plates 30, 32 along forming path A-B. Corresponding upper rollers 26, 27 freely rotate in a direction opposite to lower rollers 28, 29 as indicated by arrow D on roller 26, to aid in conveying laminate 20 and plates 30, 32 along forming path A-B.

Figure 2:
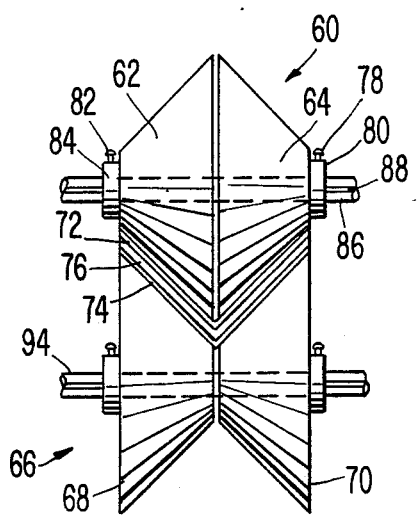
FIG. 2 is an end view of a roller and plate assembly of a second embodiment of the present invention used with the apparatus of FIG. 1 for forming a plastic laminate into a V-shaped configuration.
Figure 2A:
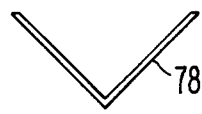
FIG. 2A is an end view of a V-shaped laminate part formed by the roller and plate assembly of FIG. 2.
Figure 3:
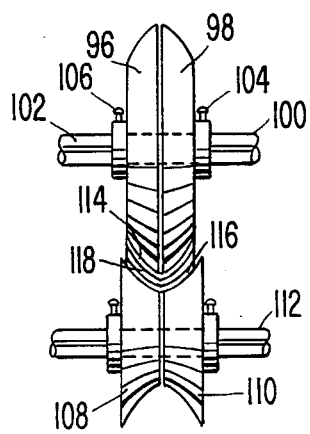
FIG. 3 is an end view of a roller and plate assembly in accordance with a third embodiment of the invention used with the apparatus of FIG. 1 for forming thermoplastic laminate into a curved V-configuration.
Figure 4:
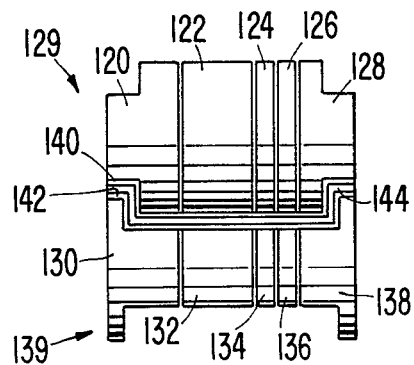
FIG. 4 is an end view of a roller and plate assembly in accordance with a fourth embodiment of the invention used with the apparatus of FIG. 1 for forming laminate into a hat-shaped or C-shaped configuration.
Figure 5:
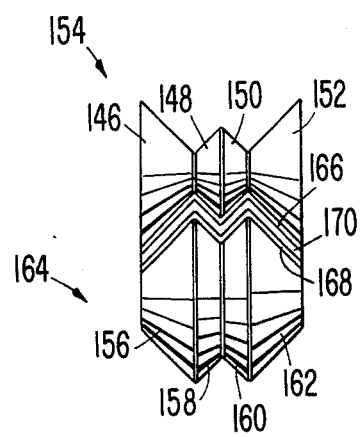
FIG. 5 is an end view of a roller and plate assembly in accordance with a fifth embodiment of the invention used with the apparatus of FIG. 1 for forming a thermoplastic laminate into a modified Z-shaped or modified M-shaped configuration.

As embodied in FIG. 1, each plate 30, 32 and the periphery of the corresponding roller 26, 28 is substantially Z-shaped, for forming substantially Z-shaped laminate parts. However, the principles of the invention may be applied in forming any number of shapes. For example, the rollers and plates of FIG. 2 are configured to form a V-shaped part (a 90° angle part). FIG. 3 shows rollers and plates for forming a curved V-shaped part. The rollers and plates of FIG. 4 are shaped to form a hat-shaped part or a C-shaped part. Finally, the rollers and plates of FIG. 5 are configured to form a Z-shaped or M-shaped part. In a further embodiment (not shown) for forming flat laminate panels, all of the upper and lower rollers and plates have correspondingly planar surfaces.

In each of the above embodiments, each roller has a shape corresponding to the plate it engages. Moreover, the upper roller and plate and the lower roller and plate have complementary shapes for defining the forming path A-B.

Preferably, each of the upper rollers and lower rollers includes a plurality of individual removably mounted circumferential segments for providing selected peripheral profiles in accordance with their axial arrangement along their respective upper and lower shafts. As embodied herein, and referring to FIG. 2, a first or upper roller 60 is composed of roller segments 62, 64 which together form a first profile. A second or lower roller 66 is composed of roller segments 68, 70, which define a second profile. The second profile is complementary in shape to the shape of the first profile for forming a selected peripheral profile and defining a V-shaped forming path for laminate 76.

A first or upper plate 72 having a shape corresponding to the shape of upper roller 60 is positioned between laminate 76 and upper roller 60. A second or lower plate 74 having a shape corresponding to the shape of lower roller 66 is positioned between laminate 76 and lower roller 66.

Preferably, adjustable fixing means are provided for removably mounting the roller segments to corresponding shafts.

Figure 6:
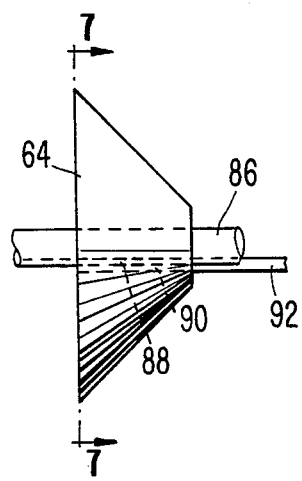
FIG. 6 is an end view of one of the roller segments shown in FIG. 2.
Figure 7:
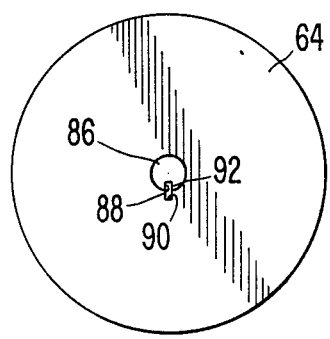
FIG. 7 is a view taken along line 7—7 of FIG. 6.

As embodied herein, and referring to upper roller 60 in FIG. 2, the adjustable fixing means includes set screw 78 positioned in hub 80 of roller element 64 and set screw 82 positioned in hub 84 of roller element 62. Set screws 78, 82 are screwed against shaft 86 for preventing axial movement of roller segments 62, 64. Referring to FIGS. 2, 6, and 7, the adjustable fixing means further includes axial groove 88 in shaft 86 and axial groove 90 in roller segments 62, 64, which grooves are sized to receive locking pin 92 when aligned. Locking pin 92 fits into aligned grooves 88, 90 for preventing rotation of roller segments 62, 64 with respect to shaft 86. Lower roller segments 68, 70 in FIG. 2 are similarly removably fixed to shaft 94, as are the roller segments of each of the embodiments shown in FIGS. 3 and 5.

Figure 3A:
FIG. 3A is an end view of curved V-shaped laminate formed by the roller and plate assembly of FIG. 3.

Referring to FIG. 3, upper roller segments 96, 98 are removably fixed to shaft 100 having axial groove 102. Screws 104, 106 are provided for fixing upper roller segments 96, 98 to shaft 100 to prevent axial movement of upper roller segments 96, 98. Groove 102 is aligned with axial grooves (not shown) in each of upper roller segments 96, 98 for receiving a locking pin (not shown) to prevent rotational movement of upper roller segments 96, 98 with respect to shaft 100. Lower roller segments 108, 110 are similarly removably fixed to shaft 112 and have a peripheral profile complementary to the profile of roller segments 96, 98. Laminate 118 is disposed between plates 114, 116 which are positioned between upper and lower roller segments 96, 98 and 108, 110, respectively, for making curved V-shaped parts 118, shown in FIG. 3A.

Figure 4A:
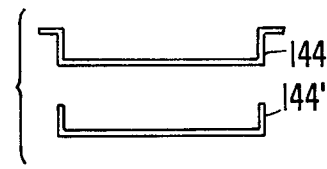
FIG. 4A is an end view of a hat-shaped and C-shaped laminate parts formed by the roller and plate assembly of FIG. 4.

Referring to FIG. 4, upper roller segments 120, 122, 124, 126, 128 form a first or upper roller 129 having a first peripheral profile. Lower roller segments 130, 132, 134, 136, 138 form a second or lower roller 139 having a second peripheral profile complementary in shape to the first profile. Laminate 144 is disposed between plates 140, 142 which are disposed between rollers 129 and 139, respectively, for forming hat-shaped parts 144 or C-shaped parts 144', shown in FIG. 4A. Preferably, spacer roller segments 122, 124, 126 and 132, 134, 136 are provided between end roller segments 120, 128 and 130, 138 for permitting variation in the width of the channel of the hat-shaped part 144 and the C-shaped part 144'. By inserting or removing these spacer roller segments 122, 124, 126 and 132, 134, 136, the width of the part may be adjusted.

The roller segments in FIG. 4 are removably fixed to shafts (not shown) in a manner shown and discussed above with respect to FIGS. 2 and 3. Notably, to prevent axial movement of roller elements 120, 122, 124, 126, 128 and 130, 132, 134, 136, 138, only end roller segments 120, 128 and 130, 138 require fixing to their respective shafts with set screws (not shown).

Figure 5A:
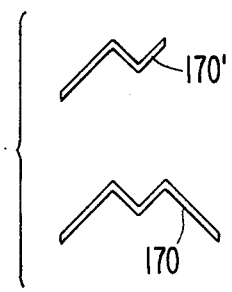
FIG. 5A is an end view of a modified Z-shaped and modified M-shaped laminate parts formed by the roller and plate assembly of FIG. 5.

Referring to FIG. 5, upper roller segments 146, 148, 150, 152 form a first or upper roller 154 having a first peripheral profile. Lower roller segments 156, 158, 160, 162 form a second or lower roller 164 having a second peripheral profile complementary in shape to the first profile. Plates 166, 168 are disposed on each side of laminate 170 between rollers 154, 164, respectively, for forming M-shaped parts 170 or Z-shaped parts 170', shown in FIG. 5A.

In operation, and referring to FIG. 1 by way of example, plates 30, 32 preferably are arranged on each side of elongate laminate 20. Preferably, elongate laminate 20 is made up of a plurality of individual thermoplastic plies each approximately 0.005–0.007 inches thick. The individual plies are cut to a desired width and length and loose stacked to give a desired part thickness. The stack of thermoplastic plies is placed between plates 30, 32, placed in an oven (not shown), or the like, and preheated to a temperature above the melting temperature of the laminate matrix, preferably to between 680–800° F. At this temperature range, laminate 20 becomes moldable and conforms to the shape of plates 30, 32. Alternatively, plates 30, 32 and the stack of thermoplastic plies can be heated separately and arranged together at the forming temperature.

The plate and laminate arrangement is then removed from the oven, and introduced between upper roller 26 and lower roller 28 to convey plates 30, 32 along forming path A-B. Lower roller 28 positioned on shaft 44 and second lower roller 29 positioned on shaft 45 are continuously driven by toothed belt 52, which drivingly engages toothed rollers 54, 56 positioned on shafts 44, 45, respectively, to transport laminate 20 at a predetermined rate along forming path A-B.

The rate of travel of the laminate is important since it is directly related to the rate at which the laminate cools. The cooling rate can affect the final properties of the part made. For example, some thermoplastics are semicrystalline and their final part properties are tied to the cooling rate. Preferably, the cooling rate of a semicrystalline thermoplastic is 21° F/second.

As plates 30, 32 are conveyed along forming path A-B, air cylinders 42 urge upper rollers 26, 27 toward forming path A-B. Upper rollers 26, 27 pressingly engage contact surface 38 of upper plate 30 and lower rollers 28, 29 engage contact surface 40 of lower plate 32 for forming laminate 20 to a shape corresponding to the shape of the respective forming surfaces 34, 40 of plates 30, 32.

A predetermined pressure should be maintained on the plate and laminate arrangement along forming path A-B during its cool down from approximately 680–800° F. to approximately 300–450° F. The amount of pressure required depends on the particular thermoplastic used. Preferably, the predetermined forming pressure is between 100-500 psi.

Contact surfaces 38, 40 of plates 30, 32 each have a shape corresponding to the shape of forming surfaces 34, 36 of respective plates 30, 32. Upper rollers 26 and 27 have an outer surface for form-fittingly engaging contact surface 38 of upper plate 30. Lower rollers 28, 29 have an outer surface with a shape that is complementary to that of upper rollers 26, 27 for form-fittingly engaging contact surface 40 of lower plate 32.

As laminate 20 is conveyed along forming path A-B, rollers 26, 28, 27 and 29 conductively remove heat from the plate and laminate arrangement. Exposure to the atmosphere further cools the plate and laminate arrangement. Form-fitting rollers 26, 28, 27 and 29 also maintain a relatively uniform pressure across the width of laminate 20 as it is formed. Moreover, plates 30, 32 distribute the pressure of rollers 26, 27, 28, 29 along the length of laminate 20 for maintaining a shaping force on laminate 20 between the roller pairs. Such an even distribution of forces improves the quality of the formed laminate part since laminate 20 is cooled while being pressed to the desired shape. That is, the negative effects of the gaps between rollers of prior art roller-type devices is minimized by plates 30, 32, which distribute the pressure along the length of laminate 20, including between the rollers. Additionally, plates 30, 32 protect laminate 20 from contamination as it moves along forming path A-B.

Once laminate 20 and plates 30, 32 have passed through rollers 26, 27, 28, 29, and laminate 20 drops below its glass transition temperature, plates 30, 32 are removed from laminate 20 and the resultant shaped part is removed. Since plates 30, 32 have not been deformed by transitional rollers in forming the shaped part, plates 30, 32 may be used again to form any number of parts.

It should also be noted that the rollers of the invention do not require individual design and tooling. All of the upper rollers have the same shape and all of the lower rollers have the same shape. The shape of the upper and lower rollers is complementary as shown in FIGS. 1-5.

Other embodiments of the invention will be apparent to the skilled in the art from consideration of the specification and practice of the invention disclosed herein. By way of example, additional pairs of upper and lower rollers could be placed along the length of forming path A-B. It is intended that the specification and examples be considered as exemplary only, with a true scope and spirit of the invention being indicated by the following claims.

We claim:

1. A device for forming elongate laminate into a predetermined configuration having a substantially uniform cross-sectional shape in the axial direction, comprising:
   first and second roller means rotatably mounted in peripheral tangential relation for defining a forming path therebetween, each said roller means having a transverse peripheral profile corresponding to the predetermined configuration of the formed laminate and being complementary to the other said roller means;
   a pair of elongated plate means adapted to be positioned between the laminate and said first and second roller means for maintaining a predetermined pressure on the laminate along the forming path, each said plate means having a side for engaging the laminate and a side for engaging the periphery of a corresponding one of said first and second roller means and each having a transverse configuration corresponding to the transverse peripheral profile of the corresponding one of the first and second roller means.

2. The device of claim 1, wherein said first roller means includes a first plurality of individual rollers spaced along one side of the forming path and wherein said second roller means includes a second plurality of individual rollers spaced along an opposite side of the forming path in opposing relation to the first plurality of individual rollers.

3. The device of claim 2, further comprising means for movably mounting the first plurality of rollers for permitting movement of said first plurality of rollers toward and away from the second plurality of rollers.

4. The device of claim 3, further comprising means for selectively biasing the first plurality of rollers toward the second plurality of rollers.

5. The device of claim 4, wherein said movable mounting means includes first shaft means having at least one of said first and second plurality of rollers fixed thereon, support blocks positioned at each end of said first shaft means for rotatably supporting said first shaft means, and slots positioned on opposing sides of said support means for receiving said support blocks, said support blocks being slidable within said slots.

6. The device of claim 5, wherein said first plurality of rollers are upper rollers and wherein said second plurality of rollers are lower rollers, said upper rollers being movable toward and away from said lower rollers.

7. The device of claim 6, wherein said biasing means movably engages said support blocks for biasing the upper rollers toward the lower rollers during forming.

8. The device of claim 7, wherein said biasing means includes a plurality of air cylinders each having a sliding piston for movably engaging each of said support blocks.

9. The device of claim 2, wherein each of said first and second plurality of individual rollers includes a plurality of individual removably mounted circumferential segments for providing selected peripheral profiles in accordance with their arrangement along their corresponding axis of rotation.

10. The device of claim 9, wherein said predetermined configuration includes two planar portions disposed at a substantially 90° angle for forming substantially V-shaped elongate laminate.

11. The device of claim 9, wherein said predetermined configuration includes three angularly disposed planar portions for forming substantially Z-shaped elongate laminate.

12. The device of claim 9, wherein said predetermined configuration includes four angularly disposed planar portions for forming substantially M-shaped elongate laminate.

13. A device for forming elongate laminate into a predetermined configuration having a substantially uniform cross-sectional shape in the axial direction, comprising:
   support means;
   first and second roller means rotatably mounted on the support means in peripheral tangential relation for defining a forming path therebetween, each said roller means having a transverse peripheral profile corresponding to the predetermined configuration of the formed laminate, the first roller means being movably mounted to move toward and away from the rotational axis of the second roller means;

a pair of elongated plate means adapted to be positioned between the laminate and said first and second roller means for maintaining a predetermined pressure on the laminate along the forming path, each said plate means having a side for engaging the laminate and a side for engaging the periphery of a corresponding one of said first and second roller means and each having a transverse configuration corresponding to the transverse peripheral profile of the corresponding one of the first and second roller means;

means for biasing the movably mounted first roller means toward the second roller means to engage the pair of plate means for maintaining a predetermined pressure on the laminate along the forming path; and means for rotating at least one of the first and second roller means for transporting the pair of plate means along the forming path at a predetermined rate.

14. The device of claim 13, further comprising means for movably mounting the first roller means on the support means for permitting movement of the first roller means toward and away from the second roller means.

15. The device of claim 14, wherein said movable mounting means includes first shaft means having the first roller means fixedly mounted thereon, support blocks positioned at each end of said first shaft means for rotatably supporting said first shaft means, and slots positioned in opposing sides of said support means for receiving said support blocks, said support blocks being slidable within said slots.

16. The device of claim 15, wherein the biasing means movably engages the support blocks for biasing the first roller means toward the second roller means during forming.

17. The device of claim 16, further comprising second shaft means for rotatably mounting said second roller means on said support means, wherein said first roller means includes a plurality of individual upper rollers spaced along one side of the forming path and wherein the second roller means includes a plurality of lower rollers spaced along an opposite side of the forming path in opposing relation to the plurality of upper rollers, and wherein said first and second shaft means include individual upper and lower shafts corresponding to each of the upper and lower rollers.

18. The device of claim 17, wherein each of the upper and lower rollers includes a plurality of individual removably mounted circumferential segments for providing selected peripheral profiles in accordance with their arrangement along their respective upper and lower shafts.

19. The device of claim 18, further comprising adjustable fixing means for removably mounting the circumferential segments of each of the upper and lower rollers on corresponding upper and lower shafts, each of the segments having a bore for receiving the corresponding upper and lower shaft.

20. The device of claim 19, wherein the adjustable fixing means includes an axial groove disposed along each of the upper and lower shafts and an axial groove disposed along the bore of each segment, the axial grooves being adapted for alignment with each other, the adjustable fixing means further including pin means adapted for slidable insertion into the aligned axial grooves for rotationally fixing the segments to their corresponding shaft.

21. The device of claim 20, wherein the adjustable fixing means includes screw means adapted for insertion in a radial aperture in axial end ones of the segments on each upper and lower shaft to prevent axial movement of the segments.

22. The device of claim 3, wherein said second plurality of rollers is movable toward and away from the first plurality of rollers.

23. The device of claim 14, wherein said second roller means is movable toward and away from the first roller means.

* * * * *